(12) United States Patent
Peiffer et al.

(10) Patent No.: US 6,428,882 B1
(45) Date of Patent: *Aug. 6, 2002

(54) BIAXIALLY ORIENTED POLYESTER FILM WITH HIGH OXYGEN BARRIER, ITS USE, AND PROCESS FOR ITS PRODUCTION

(75) Inventors: Herbert Peiffer, Mainz; Cynthia Bennett, Alzey; Gottfried Hilkert, Saulheim; Werner Roth, Eppstein, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/079,238

(22) Filed: May 14, 1998

(30) Foreign Application Priority Data

May 14, 1997 (DE) .......................... 197 20 505

(51) Int. Cl.[7] .................. B32B 15/08; B32B 18/00; B32B 27/06; B32B 27/36
(52) U.S. Cl. ................ 428/220; 428/336; 428/430; 428/458; 428/480; 428/910
(58) Field of Search ................ 428/480, 336, 428/220, 337, 458, 448, 910, 430

(56) References Cited

U.S. PATENT DOCUMENTS

| | | | |
|---|---|---|---|
| 5,506,014 A | | 4/1996 | Minnick .................... 428/35.7 |
| 5,604,019 A | * | 2/1997 | Bland et al. ................ 428/212 |
| 5,645,923 A | * | 7/1997 | Matsuo et al. ............. 428/216 |
| 5,753,377 A | * | 5/1998 | Takahashi et al. .......... 428/480 |
| 5,955,181 A | * | 9/1999 | Peiffer et al. .............. 428/212 |
| 5,976,653 A | * | 11/1999 | Collette et al. ............. 428/36.7 |

FOREIGN PATENT DOCUMENTS

| | | |
|---|---|---|
| EP | 0 602 964 A1 | 6/1994 |
| JP | 6023902 A | 2/1994 |
| JP | 6218869 A | 8/1994 |
| JP | 09118232 | 5/1997 |
| WO | WO 95/16554 | 6/1995 |

OTHER PUBLICATIONS

Ullmann's Encyclopedia of Industrial Chemistry, 5th Edition, vol. A1, pp. 248–249, May, 1994.*
Encyclopedia of Polymer Science and Engineering, vol. 1: Additives, pp. 472–475, Aug. 1995.*
European Search Report for related Application No.: 98108017.9 dated May 28, 2001.

* cited by examiner

Primary Examiner—Paul Thibodeau
Assistant Examiner—Ramsey Zacharia

(57) ABSTRACT

A biaxially oriented polyester film is disclosed which has a base layer of at least 80% by weight of a thermoplastic polyester, and which has a cover layer and, located on the cover layer, a layer functioning as an $O_2$ barrier, wherein said cover layer is composed of a polymer or of a mixture of polymers which comprises at least 40% by weight of ethylene 2,6-naphthalate units; 0% up to 40% by weight of ethylene terephthalate units; and, if desired, up to 60% by weight of units from other aliphatic, cycloaliphatic or aromatic diols and/or aliphatic, cycloaliphatic or aromatic dicarboxylic acids; with the proviso that the $T_g2$ value of the polyester film is above the $T_g2$ value of the base layer but below the $T_g2$ value of the cover layer. The film has particularly low atmospheric oxygen transmission and has high gloss. It is particularly suitable for packaging light- and air-sensitive foodstuffs and other light- and air-sensitive consumable items, and also for producing insulating materials.

18 Claims, No Drawings

BIAXIALLY ORIENTED POLYESTER FILM WITH HIGH OXYGEN BARRIER, ITS USE, AND PROCESS FOR ITS PRODUCTION

BACKGROUND OF THE INVENTION

1) Field of the Invention

The invention relates to a biaxially oriented polyester film having a base layer of at least 80% by weight based on the total weight of the base layer of at least one thermoplastic polyester, and having a cover layer functioning as a barrier layer. The invention furthermore relates to the use of the film and to a process for its production.

2) Prior Art

In many food and drink packaging applications, there is demand for a high barrier effect with respect to gases, water vapor and flavors (this having the same significance as low transmission or low permeability). A well-known process for producing packaging of this type consists in high-vacuum aluminum metallizing of the plastics films used for this purpose. Another well-known process consists in coating the films with ceramic materials, such as $SiO_x$, $AlO_x$ or $MgO_x$. The barrier effect with respect to the above-mentioned substances depends essentially on the type of polymers in the film and the quality of the barrier layers applied. For example, metallized, biaxially oriented polyester films have a very high barrier effect with respect to gases, such as oxygen, and to flavors. Metallized, biaxially oriented polypropylene films are in turn very effective barriers with respect to water vapor.

The good barrier properties of metallized or ceramically coated films mean that they are used in particular for packaging foodstuffs and other consumable items, for which long storage or transport times create the risk that the packaged foodstuffs become spoilt or rancid or lose flavor if there is an inadequate barrier; examples are coffee, snacks containing fats (nuts, potato chips, etc.) and drinks containing carbon dioxide (in pouches). In addition, coated polyester films are suitable for heat-insulation of technical devices. For example, polyester films metallized with aluminum can be used to improve insulation in refrigerators. The insulation produced with these films works on the vacuum-flask principle, the insulation essentially consisting of two laminates (more than one layer of aluminum-metallized polyester films) into which, for example, sheets of foam are welded. The sheets of foam, welded in under reduced pressure, serve essentially as distance pieces between the two laminates. For the required reduced pressure to be maintained, the laminates must exhibit a very high oxygen barrier.

If polyester films to which a metallized aluminum layer has been applied are to be used as packaging material, then they are generally a constituent of a composite film (laminate) having more than one layer. Bags produced therefrom may be filled, for example, on a vertical tubular bag forming, filling and sealing machine (vffs). The bags are sealed on their inward side (i.e. on the side facing their contents), the sealable layer consisting generally of polyethylene or polypropylene. The composite film here typically has the following structure: polyester layer/aluminum layer/adhesive layer/sealable layer. If the laminate thickness is from about 50 to 150 $\mu$m, the thickness of the metal layer is only from 20 to 50 nm. Even a very thin aluminum layer is therefore sufficient to achieve adequate light protection and very good barrier properties.

The oxygen barrier or the oxygen transmission is generally measured not on the laminate or the packaging itself, but on the metallized or ceramically coated polyester film. To ensure good quality of the foodstuffs or other consumable items even after relatively long storage times, the oxygen transmission (identical with permeability) of the metallized film may not be greater than 2 $cm^3/m^2$ bar d, (cubic centimeters, per square meter, bar, day) but in particular not greater than 1 $cm^3/m^2$ bar d. In the future, the demands of the packaging industry will head toward still higher barriers with attempts to achieve permeability values of significantly less than 1.0 $cm^3/m^2$ bar d.

There have been many reports of the relationship between oxygen barrier and aluminum-metallized film (substrate). A detailed review of the relevant prior art can be found, for example, in the dissertation by H. Utz (Munich Technical University, 1995: "Barriereeigenschaften aluminiumbedampfter Kunststoffolien [Barrier properties of aluminum-metallized plastics films]").

There has so far not been sufficient investigation into the detailed basis for the barrier effect of the metallized film. Clearly, the substrate surface and the type of substrate polymer and its morphology are variables with significant influence. It is generally assumed that smooth surfaces result in better barrier properties (cf. Utz, page 38 ff). In this connection, von Weiss (cf. "Thin Solids Films" 204 (1991), p. 203–216) has shown that titanium dioxide particles introduced into a coating in different concentrations after aluminum-metallizing result in higher oxygen transmissions as $TiO_2$ proportion rises. The results of the studies by Utz are said to show that there is no direct relationship between the surface roughness of the PET film and the oxygen barrier.

It is also known that the oxygen barrier can be improved by selecting particular polymers for the film serving as substrate (G. Schricker: Metallisierte Kunststoffolien für höherwertige Verpackungen [Metallized plastics films for high-quality packaging], in ICI 5th International Metallising Symposium 1986, Cannes). Polyesters, for example, are particularly suitable, specifically those made from ethylene glycol and terephthalic acid or from ethylene glycol, terephthalic acid and naphthalene-2,6-dicarboxylic acid. Besides these, polyamides, ethylene-vinyl alcohol copolymers (EVOH) and polyvinylidene chloride may also be used with advantage. For example, U.S. Pat. No. 5,506,014 describes a copolyester made from (a) from 45 to 85 mol % of terephthalic acid, (b) from 10 to 40 mol % of naphthalene-dicarboxylic acid and (c) from 5 to 15 mol % of a dicarboxylic acid having from 2 to 8 carbon atoms and (d) ethylene glycol; (the molar percentages are based on the total proportion of dicarboxylic acids). This polyester is claimed to have better barrier properties with respect to gases. It is used, inter alia, for producing bottles or containers, and also films of various thicknesses. A disadvantage of the raw materials mentioned is that they are significantly more expensive than polyethylene terephthalate (PET) or are unsuitable and/or not permitted by the authorities for use in food and drink packaging.

There are also known coextruded polyester films having a base layer of polyethylene terephthalate, of a polyester made from ethylene glycol, terephthalic acid and naphthalene-2,6-dicarboxylic acid and/or of a polyester made from ethylene glycol and napthalene-2,6-dicarboxylic acid, and having (at least) one cover layer of copolymers made from polyethylene terephthalate and polyethylene-2,6-naphthalate or from polyethylene-2,6-naphthalate homopolymers. At least one of the cover layers contains pigments. It is also known that such films can be coated or metallized.

EP-A 0 602 964 describes a polyester film for magnetic recording media (in particular magnetic tapes) which has more than one layer. It comprises one layer which is composed primarily of a polyester made from ethylene glycol and naphthalene-2,6-dicarboxylic acid, and at least one other layer which consists essentially of a copolyester built up from ethylene glycol units, diethylene glycol units and naphthalene-2,6-dicarboxylic acid units. The film may be coated on one or both sides.

It is an object of the present invention to provide a coated, biaxially oriented polyester film which is distinguished by a high oxygen barrier; (less than 0.3 cm$^3$ of oxygen per square meter and per day diffusion through the film when it is exposed to air at a pressure of 1 bar). In its other properties, the film should be at least equivalent to the known packaging films of this type. In addition, it should be simple and cost-effective to produce. A further object was to improve the gloss of the coated film.

SUMMARY OF THE INVENTION

The object is achieved by means of a biaxially oriented polyester film having a base layer of at least 80% by weight based on the total weight at the base layer of at least one thermoplastic polyester, and having a cover layer and, located on the cover layer, a metallic or ceramic layer, wherein the film has a cover layer composed of a polymer, or of a copolymer, or of a mixture of polymers which comprises at least 40% by weight of ethylene 2,6-naphthalate units; and optionally 0% up to 40% by weight of ethylene terephthalate units; and, if desired, up to 60% by weight of units from other aliphatic, cycloaliphatic or aromatic diols and/or aliphatic, cycloaliphatic, or aromatic dicarboxylic acids; with the proviso that the $T_g2$ value of the polyester film is above the $T_g2$ value of the base layer but below the $T_g2$ value of the cover layer.

In another sense, the present invention also comprises a polyester film having a base layer of at least 80% by weight of at least one polyester, a cover layer, and located on the cover layer a ceramic or metallic layer, the cover layer comprising at least 5% by weight of ethylene 2,6-naphthalate units; and at least 40% by weight of ethylene terephthalate units.

DESCRIPTION OF THE EMBODIMENTS

Preference is given to a polyester film in which the polymers of the cover layer comprise at least 40% by weight of ethylene 2,6-naphthalate units and optionally 0% up to 40% by weight of ethylene terephthalate units. Among these, particular preference is then given to a polyester film of this type in which the polymers of the cover layer comprise at least 70% by weight of ethylene 2,6-naphthalate units and up to 30% by weight of ethylene terephthalate units. The polymer for the cover layer may also comprise 100% by weight ethylene 2,6-naphthalate units.

Examples of other suitable aliphatic diols are diethylene glycol, triethylene glycol, aliphatic glycols of the formula HO—(CH$_2$)$_n$—OH, where n is an integer from 3 to 6, (in particular 1,3-propanediol, 1,4-butanediol, 1,5-pentanediol and 1,6-hexanediol), branched aliphatic glycols having up to 6 carbon atoms, and cycloaliphatic diols having one or more rings and if desired containing heteroatoms. Among the cycloaliphatic diols, mention may be made of cyclohexane diols (in particular 1,4-cyclohexanediol). Examples of other suitable aromatic diols are those of the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Besides these, bisphenols of the formula HO—C$_6$H$_4$—C$_6$H$_4$—OH are also very suitable.

Other preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention should be made of cyclohexanedicarboxylic acids (in particular cyclohexane-1,4-dicarboxylic acid). Among the aliphatic dicarboxylic acids, the $C_3$–$C_{19}$-alkanedioic acids are particularly suitable, where the alkane moiety may be straight-chain or branched.

The polyethylene 2,6 naphthalate in the cover layer preferably comprises a t least 40% by weight of ethylene glycol units and naphthalene-2,6-dicarboxylic acid units in a stoichiometric relationship. Furthermore, at a pressure of 1 bar, less than 0.3 cm$^3$ of atmospheric oxygen per square meter per day, preferably less than 0.25 cm$^3$/m$^2$/day, particularly preferably less than 0.20 cm$^3$/m$^2$/day, can diffuse through the novel film.

The present invention also provides a process for producing this film. It encompasses a) producing a film from base and cover layer(s) by coextrusion, b) biaxial orientation of the film, c) heat-setting of the oriented film and d) applying to the heat-set film a layer having an O$_2$ barrier function.

To produce the cover layer, it is expedient to feed granules of polyethylene terephthalate and polyethylene 2,6-naphthalate to an extruder in the desired mixing ratio. At about 300° C. and with a residence time of about 5 min, the two materials can be melted and can be extruded. Under these conditions, transesterification reactions can occur in the extruder and during these copolymers are formed from the homopolymers.

The polymers for the base layer are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation is generally carried out sequentially. For this, it is preferable to orient firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame.

The temperature at which the orientation is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

Before the transverse stretching, one or both surfaces of the film may be in-line coated by the known processes. The in-line coating may, for example, serve to improve the adhesion of the metallic layer or of any printing ink which may be applied, or else to improve the antistatic or processing behavior.

During the subsequent heat-setting the film is held for from about 0.1 to 10 s at a temperature of from 150 to 250° C. The film is then wound up in a customary manner.

The biaxially oriented and heat-set polyester film may be corona- or flame-treated on one or both sides before the layer functioning as an $O_2$ barrier is applied. The intensity of treatment is selected in such a way that the surface tension of the film is generally greater than 45 mN/m.

The layer functioning as an $O_2$ barrier, in particular the metallic layer or the ceramic layer, is expediently applied in customary industrial systems. Metallic layers of aluminum are usually produced by metallizing, while ceramic layers may in addition to this also be created using electron-beam processes or application by sputtering. The process parameters of the system during application of the metallic layer or the ceramic layer to the films correspond to the standard conditions. The metallization of the films is preferably carried out in such a way that the optical density of the metallized films is in the customary range from about 2.2 to 2.8. The ceramic layer is applied to the film in such a way that the thickness of the oxide layer is preferably in the range from 30 to 100 nm. The web speed of the film to be coated is from 5 to 10 m/s for all settings of variables. Use of a laboratory metallization system is avoided, because experience has shown that the barrier values are then generally significantly higher and cannot be used for comparative purposes.

A great advantage of this process is that the extruder can be fed with granules which do not block the machine.

The base layer of the film is preferably composed to an extent of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethyl-cyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other aliphatic, cycloaliphatic or aromatic diols and/or dicarboxylic acids, these being those which may also occur in the cover layer.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

For processing the polymers, it has proven useful to select the polymers for the base layer and the cover layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). For commercially available polyethylene terephthalates which are suitable for producing biaxially oriented films, the SVs are in the range from 600 to 1000. To ensure satisfactory film quality, the SV of the copolymers for the cover layer should be in the range from 500 to 1200. If desired, a solid phase condensation may be carried out on the respective granules in order to adjust the SVs of the materials as necessary. It is a general rule that the SVs of the polymer melts for base and cover layer(s) should differ by not more than 200, preferably not more than 100.

The polymers for the cover layer may be prepared in three different ways:

a) In copolycondensation, terephthalic acid and naphthalene-2,6-dicarboxylic acid are placed in a reactor together with ethylene glycol, and polycondensed to give a polyester, using the customary catalysts and stabilizers. The terephthalate and naphthalate units are then randomly distributed in the polyester.

b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) PET and PEN are mixed as granules in the desired ratio, and the mixture is introduced to the extruder for the cover layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the cover layer. These are either directly admixed with the base layer during extrusion or are in any case present in the film due to addition of recycled material. The proportion of these copolymers in the base layer is selected in such a way that the base layer has crystalline character.

In another embodiment, the film encompasses, on the side facing away from the cover layer, another cover layer of polyethylene terephthalate, and this layer, like the cover layer to be metallized, may contain pigments.

The novel film exhibits a surprisingly high oxygen barrier. If, in contrast, the polymers used for the cover layer(s) to be coated comprise less than 40% by weight of ethylene 2,6-naphthalate units and more than 40% by weight of ethylene terephthalate units then in many cases, although the film has somewhat lower oxygen transmission than a metallized or coated standard polyester film (composed to an extent of 100% by weight of polyethylene terephthalate), the transmission is still much too high. It has even been found that the oxygen barrier is poorer than in a metallized or ceramically coated standard polyester film if the cover layer comprises from 30 to 40% by weight of ethylene 2,6-naphthalate units and from 60 to 70% by weight of ethylene terephthalate units. However, even under these circumstances there may be advantage in a film having a cover layer which comprises from 5 to 40% by weight of ethylene 2,6-naphthalate units and more than 40% by weight of ethylene terephthalate units, if the oxygen barrier does not play a decisive part in the application concerned.

In the novel films, moreover, the glass transition temperature $T_g$ of the copolymer or of the copolymers of the cover layer(s) differs from the prior art in being higher than the glass transition temperature $T_g$ of the polymers of the base layer. The glass transition temperature of the copolymers used for the cover layer(s) is preferably in the range from 80 to 102° C. In the DSC determination of the glass transition temperatures, the transitions of the two layers cannot be differentiated.

Glass transition temperatures which are determined on biaxially oriented, heat-set films in the first heating procedure (termed $T_g1$ below) are, due to crystallinity and also to molecular stresses in the amorphous fraction of the specimens, relatively small in size, distributed over a wide temperature range, and shifted to higher temperatures. Because of orientation effects in particular, they are not suitable for characterizing a polymer. The resolution of DSC analyzers is often insufficient to detect the glass transitions in the first heating procedure ($T_g1$) of the individual layers of the novel film, the transitions being "blurred" and small, due to orientation and crystallinity. If the specimens are melted and then rapidly cooled again to below their glass transition temperature (quenched), the orientation effects are eliminated. On renewed heating, glass transitions (designated $T_g2$ here) are then measured which have a greater intensity and are characteristic of the respective polymers. However, even here it is not possible to differentiate the glass transitions of the individual layers, since the layers mix on melting and the polyesters present therein enter into transesterification reactions with one another. It is fully sufficient, however, to compare the $T_g2$ of the entire coextruded films with the $T_g2$ of the polymer used for the base layer. In known films (where, for example, the cover layer contains isophthalic acid) the $T_g2$ value of the base layer is higher than that of the coextruded film, whereas the $T_g2$ value of the cover layer is lower than that of the base layer and also than that of the coextruded film. Exactly the opposite of this applies for the novel film. Here, the $T_g2$ value of the coextruded film is higher than that of the base layer but lower than the $T_g2$ value of the cover layer.

The required high oxygen barrier is not achieved if the layer functioning as an $O_2$ barrier is applied on the side of the base layer facing away from the cover layer (and not on the cover layer itself). This applies also if the make-up of base layer and cover layer otherwise corresponds to the novel film.

The base layer and the cover layer(s) may, in addition, contain customary additives, such as stabilizers and antiblocking agents. They are expediently added to the polymer or to the polymer mixture before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin, crosslinked polystyrene particles and crosslinked acrylate particles.

The additives selected may also be mixtures of two or more different antiblocking agents or mixtures of antiblocking agents of the same make-up but of different particle size. The particles may be added to the individual layers in the customary concentrations, e.g. as glycolic dispersion during the polycondensation or via masterbatches during extrusion. Pigment concentrations of from 0.0001 to 5% by weight have proven particularly suitable. A detailed description of the antiblocking agents is found, for example, in EP-A-0 602 964.

The film may be coated or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The novel polyester film preferably also contains a second cover layer. The structure, thickness and make-up of a second cover layer may be selected independently of the cover layer already present, and the second cover layer may likewise comprise the abovementioned polymers or polymer mixtures, but these do not necessarily have to be identical with those of the first cover layer. The second cover layer may also comprise other commonly used cover layer polymers.

Between the base layer and the cover layer(s), there may also be an intermediate layer if desired. It may be composed of the polymers described for the base layers. In a particularly preferred embodiment, it is composed of the polyester used for the base layer. It may also contain the customary additives described. The thickness of the intermediate layer is generally greater than 0.3 $\mu$m and is preferably in the range from 0.5 to 15 $\mu$m, in particular from 1.0 to 10 $\mu$m.

The thickness of the cover layer(s) is generally greater than 0.1 $\mu$m and is preferably in the range from 0.2 to 5 $\mu$m, in particular from 0.2 to 4 $\mu$m, and it is possible for the cover layers to have identical or different thicknesses. The total thickness of the novel polyester film may vary within wide limits and depends on the application envisaged. It is preferably from 4 to 100 $\mu$m, in particular from 5 to 50 $\mu$m, preferably from 6 to 30 $\mu$m, the base layer preferably representing a proportion of from about 40 to 90% of the total thickness.

The layer functioning as an $O_2$ barrier is preferably composed of aluminum. However, other materials which can be applied in the form of a thin coherent layer are also suitable. Silicon, for example, is particularly suitable, and differs from aluminum in resulting in a transparent barrier layer. The ceramic layer is preferably composed of oxides of elements of the 2nd, 3rd or 4th main group of the Periodic Table, in particular of oxides of magnesium, of aluminum or of silicon. The metallic or ceramic materials generally used are those which can be applied at reduced pressured or in vacuo. The thickness of the layer applied is generally from 10 to 100 nm.

A further advantage is that the production costs of the novel film are only insignificantly greater than those of a film made from standard polyester raw materials. The other properties of the novel film which are relevant to processing and use remain essentially unchanged or are even improved. In addition, it has been ensured that rework can be used in a concentration of from 20 to 50% by weight, based on the total weight of the film, in the production of the film without significant adverse effect on its physical properties.

The film has excellent suitability for packaging light- and/or air-sensitive foodstuffs and other light- and/or air-sensitive consumable items. Specifically, it is suitable for producing vacuum packs for coffee, in particular ground coffee. In addition, it is also suitable for producing insulating materials, e.g. the insulating sheets described at the outset for refrigerators.

The following methods were used to characterize the raw materials and the films:

To measure optical density, use was made of the TD-904 densitometer from Macbeth (Division of Kollmorgen Instruments Corp.). The optical density is defined as $OD=-\lg I/I_0$, where I is the intensity of the incident light, $I_0$ is the intensity of the transmitted light and $I/I_0$ is the transmittance.

The oxygen barrier of the coated films was measured using a Mocon Modern Controls (USA) OX-TRAN 2/20 in accordance with DIN 53 380, Part 3.

The SV (solution viscosity) was determined by dissolving a specimen of polyester in a solvent (dichloroacetic acid). The viscosity of this solution and that of the pure solvent were measured in an Ubbelohde viscometer. The quotient was determined from the two values, 1000 was subtracted from this, and the value multiplied by 1000. The result was the SV.

The coefficient of friction was measured according to DIN 53 375, 14 days after production.

Surface tension was measured using the "ink method" (DIN 53 364).

The haze of the film was measured in accordance with ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 4° pinhole. Gloss was measured in accordance with DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photo-electric detector. The value measured is dimensionless and must be stated together with the angle of incidence.

The glass transition temperatures $T_g1$ and $T_g2$ were measured using film samples with the aid of DSC (Differential scanning Calorimetry). Use was made of a DuPont DSC 1090. The heating rate was 20 K/min and the specimen weight was about 12 mg. In the first heating procedure, the glass transition $T_g1$ was determined. Many of the specimens showed an enthalpy relaxation (a peak) at the beginning of the step-like glass transition. The temperature taken as $T_g1$ was that at which the step-like change in heat capacity—without reference to the peak-shaped enthalpy relaxation—achieved half of its height in the first heating procedure. In all cases there was only a single glass transition stage in thermogram in the first heating procedure. It is possible that the peak-shaped enthalpy relaxations obscured the fine structure of the step, or that the resolution of the device was not adequate to separate the small, "blurred" transitions of oriented, crystalline specimens. To eliminate their heat history, the specimens were held at 300° C. for 5 minutes after the heating procedure, and then quenched with liquid nitrogen. The temperature for the glass transition $T_g2$ was taken as the temperature at which the transition reached half of its height in the thermogram for the second heating procedure.

The following examples illustrate the invention. The products used (trademarks and companies) are given only once in each case, and then relate to the examples which follow.

EXAMPLE 1

The polymer for the cover layer was prepared by copolycondensation. For this, dimethyl terephthalate and 2,6-dimethyl naphthalenedicarboxylate were mixed in a reactor in a molar ratio of 0.54:1.00 (corresponding to a make-up of 30% by weight of ethylene terephthalate units and 70% by weight of ethylene 2,6-naphthalate units in the final copolymer), and then mixed with ethylene glycol and, as catalyst, 300 ppm of manganese acetate. The transesterification was carried out with stirring at from 160 to 250° C., at atmospheric pressure, and the methanol obtained during this process was distilled off. An equimolar amount of phosphoric acid, as stabilizer, and 400 ppm of antimony trioxide, as catalyst, were then added. The polycondensation was carried out with stirring at 280° C. and a pressure of less than 1 mbar. The molecular weight achieved could be determined by measuring the torque on the stirrer. After the reaction, nitrogen pressure was used to discharge the melt from the reactor, and it was then pelletized.

EXAMPLE 2

Commercially available polyethylene terephthalate pellets and polyethylene 2,6-naphthalate pellets were used for the cover layer. In each case, the pellets were crystallized and dried for about 4 h at a temperature of about 160° C. The two materials in a ratio of 30:70 (30% by weight of polyethylene terephthalate and 70% by weight of polyethylene 2,6-naphthalate) were then placed in a mixer, where they were homogenized by stirring. The mixture was then passed to a twin-screw compounder (ZSK from Werner and Pfleiderer, Stuttgart), where it was extruded at a temperature of about 300° C. and with a residence time of about 3 min. The melt was extruded and chipped. A copolymer was produced in the extrusion by reaction between the polyethylene terephthalate and polyethylene 2,6-naphthalate.

EXAMPLE 3

Example 2 was repeated, but, for production of the film, chips of polyethylene terephthalate and of polyethylene 2,6-naphthalate were fed in a mixing ratio of 3:7 directly to the single-screw extruder, where the two materials were extruded at about 300° C. The melt was filtered and extruded through a coextrusion die to give a flat film, and laid as cover layer onto the base layer. The coextruded film was discharged across the die lip and solidified on a chill roll. The residence time of the two polymers in the extrusion was about 5 min. Further steps were as given above. Here, too, the copolymer was produced in the extrusion under the conditions given.

EXAMPLE 4

Chips of polyethylene terephthalate were dried at 160° C. to a residual moisture of less than 50 ppm and fed to the extruder for the base layer. Besides this, chips of polyethylene terephthalate and polyethylene 2,6-naphthalate (in a weight ratio of 3:7) were likewise dried at 160° C. to a residual moisture of less than 50 ppm and fed to the two extruders for the cover layers. The extruder conditions for the cover layers were as in Example 3.

A transparent three-layer film of symmetrical structure and an overall thickness of 12 $\mu$m was then produced by coextrusion followed by stepwise orientation in the longitudinal and transverse directions. Each of the cover layers has a thickness of 2 $\mu$m. The film was then metallized with aluminum on one side in an industrial metallizer. The coating speed was 5 m/s.

Base Layer
  95% by weight of polyethylene terephthalate (RT 49 from Hoechst AG) with an SV of 800 and
  5% by weight of masterbatch made from 99% by weight of polyethylene terephthalate and 1.0% by weight of silica particles (®Sylobloc 44 H from Grace) having an average particle size of 4.5 μm
Cover Layers
  70% by weight of polyethylene 2,6-naphthalate (®Polyclear N 100 prepolymer from Hoechst AG) with an SV of 1000,
  20% by weight of polyethylene terephthalate having an SV of 800 and
  10% by weight of masterbatch made from 99.0% by weight of polyethylene terephthalate and 1.0% by weight of silica particles having an average particle size of 2.0 μm The individual steps were:

| Extrusion | Temperatures: | |
|---|---|---|
| | Cover layer: | 300° C. |
| | Base layer: | 300° C. |
| | Temperature of the take-off roll: | 30° C. |
| | Die gap width: | 1 mm |
| | Temperature of the take-off roll: | 30° C. |
| Longitudinal stretching | Temperature: | |
| | Longitudinal stretching ratio: | 4.0:1 |
| Transverse stretching | Temperature: | |
| | Longitudinal stretching ratio: | 4.0:1 |
| Setting | Temperature: | |

The film had the required oxygen barrier. The properties of the film produced in this manner are shown in Table 2; (in the tables, the base layer is designated "B", the cover layer "A"; any additional layer present is designated as "A" or "C" depending on whether its make-up is the same as or different than that of the metallized or ceramically coated cover layer; correspondingly, the side of the film on which the metallized or ceramically coated layer is located is designated "side A"; the non-metallized side is designated "side C" even if there is no cover layer C on this side).

EXAMPLE 5

A coextruded film is produced in a manner similar to that of Example 4, but in this case producing a three-layer coextruded film having a base layer and two cover layers and an overall thickness of 12 μm, each of the cover layers having a thickness of 2 μm.

The film was metallized with aluminum in vacuo in a conventional industrial metallizer. The coating speed was 5 m/s.

Base Layer
  100% by weight of polyethylene terephthalate having an SV of 800
Cover Layer (Only this Cover Layer Was Subsequently Metallized):
  70% by weight of polyethylene 2,6-napthalate having an SV of 1000,
  20% by weight of polyethylene terephthalate having an SV of 800 and
  10% by weight of masterbatch made from 99.0% by weight of polyethylene terephthalate and 1.0% by weight of silica particles having an average particle size of 2.0 μm.
Further Cover Layer
  80% by weight of polyethylene terephthalate having an SV of 800 and
  20% by weight of masterbatch made from 99.0% by weight of polyethylene terephthalate and 1.0% by weight of silica particles, 50% of which had an average particle size of 2.5 μm and 50% of which had an average particle size of 1.0 μm.

The process conditions for all layers were as in Example 4.

EXAMPLE 6

A coextruded film having a base layer and two cover layers was produced in a manner similar to that of Example 5, with the difference that the cover layer intended for metallizing now had the following make-up:
  90% by weight of polyethylene 2,6-napthalate having an SV of 1000 and
  10% by weight of a masterbatch made from 99.0% by weight of polyethylene terephthalate and 1.0% by weight of silica particles having an average particle size of 1.0 μm.

The film was produced as in Example 4, and metallized as in Example 5.

EXAMPLE 7

A coextruded film having a base layer and two cover layers was produced in a manner similar to that of Example 5, with the difference that the cover layer intended for metallizing now had the following make-up:
  90% by weight of polyethylene 2,6-napthalate having an SV of 1000 and
  10% by weight of a masterbatch made from 99.0% by weight of polyethylene 2,6-naphtha-late having an SV of 1000 and 1.0% by weight of silica particles having an average particle size of 1.0 μm.

The film was produced in a manner similar to that of Example 4, but the temperatures of longitudinal and transverse stretching were now raised by about 10° C. The film was metallized as in Example 5.

EXAMPLE 8

A three-layer coextruded film having a base layer and a cover layer on each of its sides was produced in a manner similar to that of Example 5. The overall thickness of the film was 12 μm, each of the cover layers having a thickness of 2 μm.
Base Layer
  100% by weight of polyethylene terephthalate having an SV of 800
Cover Layer: (This Was Subsequently Metallized)
  100% by weight of polyethylene 2,6-naphthalate with an SV of 1000
Further Cover Layer
  80% by weight of polyethylene terephthalate having an SV of 800 and
  20% by weight of masterbatch made from 99.0% by weight of polyethylene terephthalate and 1.0% by weight of silica particles, 50% of which had an average particle size of 2.5 μm and 50% of which had an average particle size of 1.0 μm.

The process conditions for all layers were as given in Example 7. The film was metallized as in Example 5.

EXAMPLE 9

A coextruded film was produced in a manner similar to that of Example 4, but the copolymer for the cover layers was now prepared as in Example 2. In other respects, the conditions corresponded to those in Example 4.

EXAMPLE 10

A coextruded film was produced in a manner similar to that of Example 4, but the copolymer for the cover layers was now prepared as in Example 1. In other respects, the conditions corresponded to those in Example 4.

EXAMPLE 11

A coextruded two-layer film having a base layer and a cover layer was produced in a manner similar to that of Example 4. The overall thickness of the film was 12 μm, the cover layer having a thickness of 2.5 μm.
Base Layer
- 80% by weight of polyethylene terephthalate having an SV of 800 and
- 20% by weight of masterbatch made from 99.0% by weight of polyethylene terephthalate and 1.0% by weight of silica particles, 50% of which had an average particle size of 2.5 μm and 50% of which had an average particle size of 1.0 μm.

Cover Layer
- 60% by weight of polyethylene naphthalate having an SV of 1000,
- 30% by weight of polyethylene terephthalate having an SV of 800 and 10% by weight of masterbatch made from 99.0% by weight of polyethyene terephthalate and 1.0% by weight of silica particles having an average particle size of 2.0 μm.

The process conditions for all layers were as given in Example 4. The film was metallized as in Example 5.

EXAMPLE 12

A film was produced as in Example 7 except that the cover layer thickness was only 1.5 μm instead of 2 μm.

EXAMPLE 13

A coextruded three-layer film having a base layer and a cover layer on both sides was produced in a similar manner to that of Example 5. The overall thickness of the film was 12 μm, each of the cover layers having a thickness of 2 μm.
Base Layer
- 100% by weight of polyethylene terephthalate having an SV of 800

Cover Layer (This Was Subsequently Metallized)
- 100% by weight of polyethylene 2,6-naphthalate having an SV of 1000, Further Cover Layer
- 80% by weight of polyethylene 2,6-naphthalate having an SV of 1000
- 20% by weight of masterbatch made from 99.0% by weight of polyethylene 2,6-naphthalate and 1.0% by weight of silica particles, 50% of which had an average particle size of 2.5 μm and 50% of which had an average particle size of 1.0 μm.

The process conditions for all layers were as given in Example 7. The film was metallized as described in Example 5. Compared with the film from Examples 7 and 8, this film is distinguished by greatly reduced curling.

EXAMPLE 14

A film was produced in a manner similar to that of Example 11. However, for the cover layer to be metallized use was made of a copolyester of 82% by weight of ethylene terephthalate and 18% by weight of ethylene isophthalate. The film properties are given in Table 2.

EXAMPLE 15

A single-layer PET film of the following make-up
- 80% by weight of polyethylene terephthalate having an SV of 800 and
- 20% by weight of masterbatch made from 99.0% by weight of polyethylene terephthalate and 1.0% by weight of silica particles, 50% of which had an average particle size of 2.5 μm and 50% of which had an average particle size of 1.0 μm was produced and then metallized. The (not yet metallized) film was relatively cloudy. The metallized film had reduced gloss.

EXAMPLE 16

A single-layer PEN film of the following make-up
- 80% by weight of polyethylene 2,6-naphthalate having an SV of 1000 and
- 20% by weight of masterbatch made from 99.0% by weight of polyethylene 2,6-naphthalate and 1.0% by weight of silica particles, 50% of which had an average particle size of 2.5 μm and 50% of which had an average particle size of 1.0 μm was produced and then metallized. The film had very good barrier properties.

EXAMPLE 17

A coextruded two-layer film having a base layer and a cover layer was produced in a manner similar to that of Example 11. The overall thickness was 12 μm, the cover layer having a thickness of 2.5 μm.
Base Layer
- 80% by weight of polyethylene terephthalate having an SV of 800 and
- 20% by weight of masterbatch made from 99.0% by weight of polyethylene terephthalate and 1.0% by weight of silica particles, 50% of which had an average particle size of 2.5 μm and 50% of which had an average particle size of 1.0 μm.

Cover Layer
- 50% by weight of polyethylene naphthalate having an SV of 1000,
- 40% by weight of polyethylene terephthalate having an SV of 800 and
- 10% by weight of masterbatch made from 99.0% by weight of polyethylene terephthalate and 1.0% by weight of silica particles, having an average particle size of 2.0 μm. The process conditions for all layers were as in Example 4.

EXAMPLE 18

A film was produced using the recipe and process conditions of Example 8. However, in this case, the surface of the second cover layer, not the first, was metallized.

TABLE 1

| Ethylene 2,6-naph-thalate units in | Ethylene tereph-thalate units in | Ethylene isoph-thalate units in |
| --- | --- | --- |

| Example No. | cover layer A (in % by weight) | cover layer A (in % by weight) | cover layer A (in % by weight) | $T_g^1$ (° C.) | $T_g^2$ (° C.) |
|---|---|---|---|---|---|
| 4 | 70 | 30 | 0 | 97 | 82.5 |
| 5 | 70 | 30 | 0 | 97 | 82.5 |
| 6 | 90 | 10 | 0 | 100 | 88 |
| 7 | 100 | 0 | 0 | 102 | 90 |
| 8 | 100 | 0 | 0 | 102 | 90 |
| 9 | 70 | 30 | 0 | 97 | 82.5 |
| 10 | 70 | 30 | 0 | 97 | 82.5 |
| 11 | 60 | 40 | 0 | 95 | 82 |
| 12 | 100 | 0 | 0 | 102 | 88 |
| 13 | 100 | 0 | 0 | 102 | 91 |
| 14 | 0 | 82 | 18 | 68 | 72 |
| 15 | 0 | 100 | 0 | 80 | 80 |
| 16 | 100 | 0 | 0 | 102 | 102 |
| 17 | 50 | 50 | 0 | 92 | 81 |
| 18 | 100 | 0 | 0 | 102 | 90 |

TABLE 2

| Example No. | Film thickness ($\mu$m) | Cover layer thickness ($\mu$m) | Film structure | Oxygen barrier (cm$^3$/m$^2$ bar d) | Optical density of film | Gloss (60° C.) Side A | Gloss (60° C.) Side B | Haze[1] |
|---|---|---|---|---|---|---|---|---|
| 4 | 12 | 2.0 | ABA | 0.25 | 2.60 | 175 | 175 | 2.5 |
| 5 | 12 | 2.0 | ABC | 0.26 | 2.60 | 174 | 175 | 2.6 |
| 6 | 12 | 2.0 | ABC | 0.2 | 2.60 | 176 | 175 | 2.5 |
| 7 | 12 | 2.0 | ABC | 0.12 | 2.55 | 155 | 155 | 4.0 |
| 8 | 12 | 2.0 | ABC | 0.07 | 2.55 | 160 | 155 | 4.0 |
| 9 | 12 | 2.0 | ABA | 0.25 | 2.60 | 175 | 175 | 2.5 |
| 10 | 12 | 2.0 | ABA | 0.25 | 2.60 | 175 | 175 | 2.5 |
| 11 | 12 | 2.5 | AB | 0.28 | 2.60 | 175 | 178 | 1.5 |
| 12 | 12 | 1.5 | ABC | 0.17 | 2.60 | 160 | 165 | 3.5 |
| 13 | 12 | 2.0 | ABC | 0.08 | 2.60 | 155 | 155 | 3.5 |
| 14 | 12 | 3.0 | AB | 1.1 | 2.60 | 145 | 160 | 3.0 |
| 15 | 24 | 12 | A | 1.0 | 2.70 | 120 | 150 | 6.5 |
| 16 | 24 | 12 | A | 0.05 | 2.60 | 120 | 150 | 6.5 |
| 17 | 12 | 3.0 | AB | 1.8 | 2.60 | 175 | 178 | 1.5 |
| 18 | 12 | 3.0 | ABC | 0.9 | 2.60 | 175 | 178 | 4.0 |

[1] Measured on the unmetallized film

What is claimed is:

1. A biaxially oriented polyester film having a base layer of at least 80% by weight based on the total weight of the base layer of at least one thermoplastic polyester, and having a cover layer and, located on the cover layer, a layer functioning as an O$_2$ barrier, wherein said cover layer is about 0.2 to about 4.5 $\mu$m thick and includes a polymer which comprises at least 40% by weight of ethylene 2,6-naphthalate units; and ethylene terepthalate units at greater than 0% up to 40% by weight; and if desired, 0% up to 60% by weight of units from other aliphatic, cycloaliphatic or aromatic diols and/or aliphatic, cycloaliphatic or aromatic dicarboxylic acids; with the proviso that the $T_g2$ value of the polyester film is above the $T_g2$ value of the base layer but below the $T_g2$ value of the cover layer; and wherein said base layer includes at least 90 mol percent of a component selected from the group consisting of polyethylene naphthalate, polyethylene terephthalate, and a combination thereof.

2. A film as claimed in claim 1, wherein the polymers of the cover layer comprise at least 65% by weight of ethylene 2,6-naphthalate units and up to 35% by weight of ethylene terephthalate units.

3. A film as claimed in claim 1, wherein the cover layer is pigmented.

4. A film as claimed in claim 1, wherein the film encompasses an additional cover layer on the side of the base layer facing away from the layer functioning as an O$_2$ barrier.

5. A film as claimed in claim 4, wherein the additional cover layer is pigmented.

6. A film as claimed in claim 1, wherein an intermediate layer is also located between the base layer and the cover layer.

7. A film as claimed in claim 1, having an overall thickness of from 4 to 100 $\mu$m, the base layer making up from 40 to 90% of the overall film thickness.

8. A film as claimed in claim 1, wherein the layer functioning as an O$_2$ barrier is a metallic layer and this metallic layer has an optical density in the range from 2.2 to 2.8.

9. A film as claimed in claim 1, wherein the layer functioning as an O$_2$ barrier is composed of a material selected from the group consisting of aluminum, silicon, SiO$_x$, AlO$_x$ and MgO$_x$.

10. A film as claimed in claim 1, wherein at a pressure of 1 bar less than 0.3 cm$^3$ of atmospheric oxygen per square meter and day can diffuse through the film.

11. A film as claimed in claim 1, wherein the polymers of the cover layer comprise at least 70% by weight of ethylene 2,6-naphthalate units and up to 30% by weight of ethylene terephthalate units.

12. A film as claimed in claim 1, wherein the cover layer has a thickness of from 0.2 to 4.5 $\mu$m.

13. A film as claimed in claim 1, wherein the cover layer has a thickness of from 0.3 to 4 $\mu$m.

14. A film as claimed in claim 1, having an overall thickness of from 5 to 50 $\mu$m, the base layer making up from 40 to 90% of the overall film thickness.

15. A film as claimed in claim 1, having an overall thickness of from 6 to 30 $\mu$m, the base layer making up from 40 to 90% of the overall film thickness.

16. A film as claimed in claim 1, wherein at a pressure of 1 bar less than 0.25 cm$^3$ of atmospheric oxygen per square meter and day can diffuse through the film.

17. A film as claimed in claim 1, wherein at a pressure of 1 bar less than 0.2 cm$^3$ of atmospheric oxygen per square meter and day can diffuse through the film.

18. A biaxially oriented polyester film having a base layer of at least 80% by weight based on the total weight of the base layer of at least one thermoplastic polyester, and having a cover layer and, located on the cover layer, a layer functioning as an O$_2$ barrier, wherein said cover layer includes a polymer which comprises at least 40% by weight of ethylene 2,6-naphthalate units; and ethylene terephthalate units at greater than 0% up to 40% by weight; and if desired, 0% up to 60% by weight of units from other aliphatic, cycloaliphatic or aromatic diols and/or aliphatic, cycloaliphatic or aromatic dicarboxylic acids; with the proviso that the $T_g2$ value of the polyester film is above the $T_g2$ value of the base layer but below the $T_g2$ value of the cover layer; and wherein said base layer is about 40 to about 90% of a total thickness of said film and includes at least 90 mol percent of a component selected from the group consisting of polyethylene naphthalate, polyethylene terephthalate, and a combination thereof.

* * * * *